United States Patent [19]
Ohnishi et al.

[11] Patent Number: 5,892,942
[45] Date of Patent: Apr. 6, 1999

[54] CONTROL SYSTEM WITH MICROCOMPUTER AND ASSOCIATED ELECTRICALLY RECONFIGURABLE LOGIC CIRCUIT

[75] Inventors: Koji Ohnishi, Anjo; Katsuhito Takeuchi, Toyokawa; Takayoshi Honda, Nagoya, all of Japan

[73] Assignee: Nippondenso Co., Ltd., Kariya, Japan

[21] Appl. No.: 667,788

[22] Filed: Jun. 21, 1996

[30] Foreign Application Priority Data

Aug. 1, 1995 [JP] Japan .................................. 7-196731

[51] Int. Cl.$^6$ ........................................................ G06F 9/00
[52] U.S. Cl. ........................................... 375/651; 395/557
[58] Field of Search .................................... 395/651, 652, 395/653, 557, 559, 555

[56] References Cited

U.S. PATENT DOCUMENTS

| | | | |
|---|---|---|---|
| 4,788,661 | 11/1988 | Morita | 395/651 |
| 5,297,287 | 3/1994 | Mikayama et al. | 395/651 |
| 5,513,358 | 4/1996 | Lundberg et al. | 395/651 |
| 5,535,409 | 7/1996 | Larvoire et al. | 395/651 |
| 5,696,979 | 12/1997 | Saitou | 395/651 |

*Primary Examiner*—Kevin A. Kriess
*Attorney, Agent, or Firm*—Nixon & Vanderhye P.C.

[57] ABSTRACT

A control system adaptable for use in controlling internal combustion engines has a microcomputer and a hardware circuit reconfigurable in internal logic circuitry in such a manner that the setting of configuration is completed before the microcomputer is rendered operative upon application of a power supply voltage. The microcomputer is assembled in a 4-V guarantee circuit block with its operating guarantee power supply voltage of 4 volts. A 3-V guarantee block includes a random logic circuit and an EEPROM for storage of circuit configuration set data. The 3-V guarantee block also includes a first power-on reset circuit for providing respective sections with a reset-release command signal when an applied power supply voltage potentially rises at 3 volts, and a second power-on reset circuit for forcing the random logic circuit in the reset state until completion of the reconfiguration of the hardware circuit.

23 Claims, 10 Drawing Sheets

CONTROL SYSTEM WITH MICROCOMPUTER AND ASSOCIATED ELECTRICALLY RECONFIGURABLE LOGIC CIRCUIT

BACKGROUND OF THE INVENTION

1. Field of the Invention

The present invention relates generally to an electrical control system for use in computer control, and more particularly to a control system such as an engine control system with one or more microcomputers and an associated hardware circuit having electrically reconfigurable logic when power is applied.

2. Description of Related Art

In recent years there have been several improvements in electrotonic control systems for automobile engines, particularly computer-controlled internal combustion engines adaptable for use in various types of automotive vehicles. One significant concept for improving reliability is to employ a backup circuit in addition to a microcomputer for fuel-injection control of an associated engine. The backup circuit may be a digital hardware (hard-wired) circuit that is relatively simple in circuit configuration, and is adapted for providing backup operations to replace the microcomputer which may fail in operation, thereby ensuring that an automobile continues running with enhanced safety even during malfunction of the microcomputer.

Typically, the microcomputer for engine control is operative with an operation guarantee voltage of about 4 volts. This means that the microcomputer reliably operates only when its operating voltage is above 4 volts. If a battery is degraded in performance, it may possibly happen that a power supply voltage to the microcomputer becomes intermittently lower than the operation guarantee voltage when its electrical load increases for starting an engine. If this is the case, the "backup" hardware circuit offers its importance: this circuit is rendered operative providing backup operations to retain normal operations without assistance of the malfunctioning microcomputer.

This engine control system, however, suffers from a problem in that the backup circuit is required to change in hardware configuration every time for each type of automobile with different engine specifications. This necessitates that different backup circuits should be designed and produced for different applications. One possible approach to avoid such redundant design and production of backup circuits is that the backup circuit is designed to be changeable or "reconfigurable" in internal logic circuitry by physically changing or rearranging a pattern of aluminum lead-wire connections of a large scale integrated circuit (LSI) incorporating preinstalled circuit elements that make up a specific circuit configuration as selected. However, this does not come without accompanying disadvantages: an increased number of mask patterns should be manufactured which corresponds to the number of possible different circuit configurations under modification, which requires troublesome and time-consuming work.

To avoid the problem, the inventors considered an improved reconfigurable backup circuit, which is developed using the microcomputer technology as disclosed, for example, in Published Unexamined Japanese Patent Application (JP-A) 2-159613. With the circuit, a built-in read only memory (ROM) of an engine control microcomputer stores data for use in setting the backup circuit into a desired internal logic configuration. By accessing the ROM to read the circuit configuration set data to reconfigure the backup circuit to meet a present need, it becomes possible to make the hardware arrangements of the backup circuit per se common or uniform among a wide variety of applications.

One drawback to this approach, however, is that system malfunction may still possibly occur due to unavailability of the backup circuit during a certain period ranging from the end of reset-release to the actual completion of reconfiguration of the backup circuit. More specifically, reading of the configuration set data pre-stored in the ROM is kept unattainable until when reset-releasing of a central-processing unit (CPU) of the microcomputer is completed after power is applied, namely power-on. If the microcomputer starts performing its inherent control operations immediately after the completion of such reset-release, the microcomputer is forced during the period into an undesirable condition where it must execute control operations while the backup circuit is in the process of being reconfigured. This may result in an increase in the possibility of the occurrence of system malfunction as a whole.

SUMMARY OF THE INVENTION

It is therefore an object of the present invention to provide a new and improved control system adaptable for use in various controls such as an engine control.

It is another object of the invention to provide an improved control system capable of rendering a hardware or hard-wired circuit common among different applications while enabling elimination of system malfunction and high-speed reconfiguration of the hardware circuit.

It is yet another object of the invention to provide an improved engine control system capable of permitting common use of a hardware circuit among different vehicle applications while enabling it to be rapidly reconfigured in logic prior to actual activation of a microcomputer thereby eliminating system malfunction and attaining high-speed reconfiguration thereof.

According to the present invention, provided are a control circuit device adaptable for use in controlling an associated engine system having one or more microcomputers and an electrically reconfigurable hardware or hard-wired circuit capable of being selectively configured in internal logic after power is fed. The control circuit includes a nonvolatile memory arranged in the hardware circuit for pre-storage of circuit configuration set data. Setting of a configuration, or reconfiguration, of the hardware circuit is carried out in response to the configuration set data prestored in the nonvolatile memory before the microcomputer starts to operate after power is fed.

With such an arrangement, the operating voltage of the hardware circuit is set less in potential than that of the microcomputer. Upon application of power, a power supply voltage potentially increases to first enter the operation guarantee region of the hardware circuit, and then enter the operation guarantee region of the microcomputer. When the power supply voltage of the hardware circuit rises to the operation guarantee region, the hardware circuit and its associated nonvolatile memory for prestorage of circuit configuration set data are both rendered operative causing the data to be read from the nonvolatile memory to perform reconfiguration thereof. This may enable the hardware circuit to be completed in reconfiguration prior to actual activation of the microcomputer.

Preferably, the hardware circuit preferably includes a register, a first power-on reset circuit, and a second power-on reset circuit. The first power-on reset circuit is rendered operative when the power supply voltage of the hardware circuit rises at a specific potential level corresponding to the operating voltage thereof after application of power, thereby permitting transmission of the configuration set data from the nonvolatile memory to the register so that the hardware circuit is electrically reconfigured based on the transferred data. Until completion of such reconfiguration, the hardware circuit is forced by the second power-on reset circuit to remain inoperative to thereby eliminate the issuance of any erroneous signals from such a logic-definition incomplete hardware circuit that is in the process of reconfiguration. After completion of reconfiguration, the hardware circuit is rendered operative since the second power-on reset circuit releases the forced interruption of operation thereof.

More preferably, the microcomputer is arranged to execute initialization processing when the applied power supply voltage increases at the specific potential level representative of its operating voltage, and also to begin operating in response to an external signal after the hardware circuit is made operative by the second power-on reset circuit.

Preferably, the microcomputer and the hardware circuit are mounted on a single LSI chip. This may lead to possibility of enhanced packing density with a reduction in size.

These and other objects, features and advantages of the invention will be apparent from the following more particular description of one preferred embodiment of the invention, as illustrated in the accompanying drawings.

DETAILED DESCRIPTION OF PREFERRED EMBODIMENT

Figure 1:
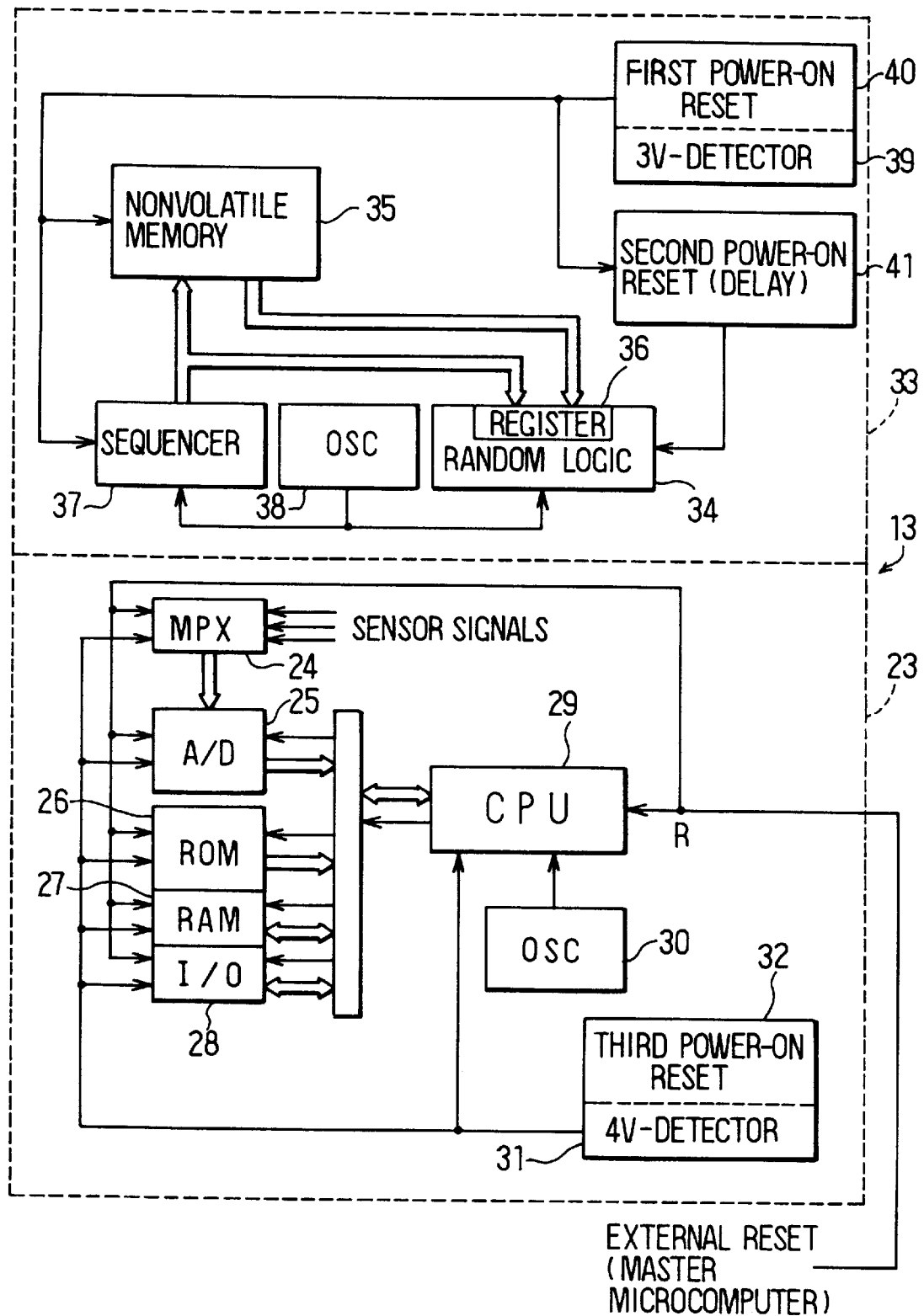
FIG. 1 is a block diagram showing electrical circuitry of a 4-V guarantee circuit block and a 3-V guarantee block of an engine control circuit in accordance with one preferred embodiment of the present invention.

An engine control system in accordance with one preferred embodiment of the invention will now be described in detail with reference to FIGS. 1 through 9. First, an overall arrangement of the system will first be discussed with reference to FIG. 4, wherein an associated multicylinder internal combustion engine for use in automotive vehicles is generally designated by numeral 61. The engine 61 has an air intake pipe 62, which is provided with a suction-air temperature sensor 63 for detecting the temperature of an incoming air flow as introduced therein through a known air cleaner (not shown). Arranged in the downstream of it is a throttle valve 64 which is associated with an idle switch 65 for detecting the full-closed state of the throttle valve 64. A surge tank 66 is placed in the downstream of the throttle valve 64, while a suction-gas pressure sensor 67 is operatively coupled to the surge tank 66 for detecting the pressure in the intake pipe. Coupled to the surge tank 66 is an air-flow bypass duct 68 through which part of the suction air flows for idle speed control while bypassing the throttle valve 64. An idle speed control valve 69 is arranged at a midway portion of the bypass duct 68, for automatically controlling or adjusting engine idling rotation speed. An intake manifold 71 is adapted for coupling the surge tank 66 to respective cylinders (only one is illustrated in FIG. 4) of the engine 61, and an injector 15 is attached thereto for injecting fuel into a respective one of the engine cylinders.

On the other hand, an exhaust manifold 74 coupled to an exhaust port 73 of the engine 61 is provided with an oxygen sensor 75 that detects the residual oxygen density in exhaust gasses. A known exhaust-gas purifying three-way catalyst (not shown) is arranged in the downstream of the exhaust manifold 74. A water jacket 76 for cooling the engine 61 is operatively associated with a water temperature sensor 77 attached thereto for detecting the temperature of cooling water. A distributor 79 is arranged on the engine 61 for directing or distributing the high-voltage ignition current in the proper firing sequence to firing plugs 78 of the respective cylinders. The distributer 79 is connected to a cylinder identification sensor 44 for providing cylinder identification signals (G1 and G2 signals) for identification of the crank angle reference position of a specified one of the cylinders, and also to a rotation angle sensor 42 that generates and issues a rotation angle signal (NE signal) indicative of an optimal frequency suitable for a detected engine rotation number. The distributor 79 is supplied by an ignitor 14 with the high-voltage secondary current.

Figure 3:
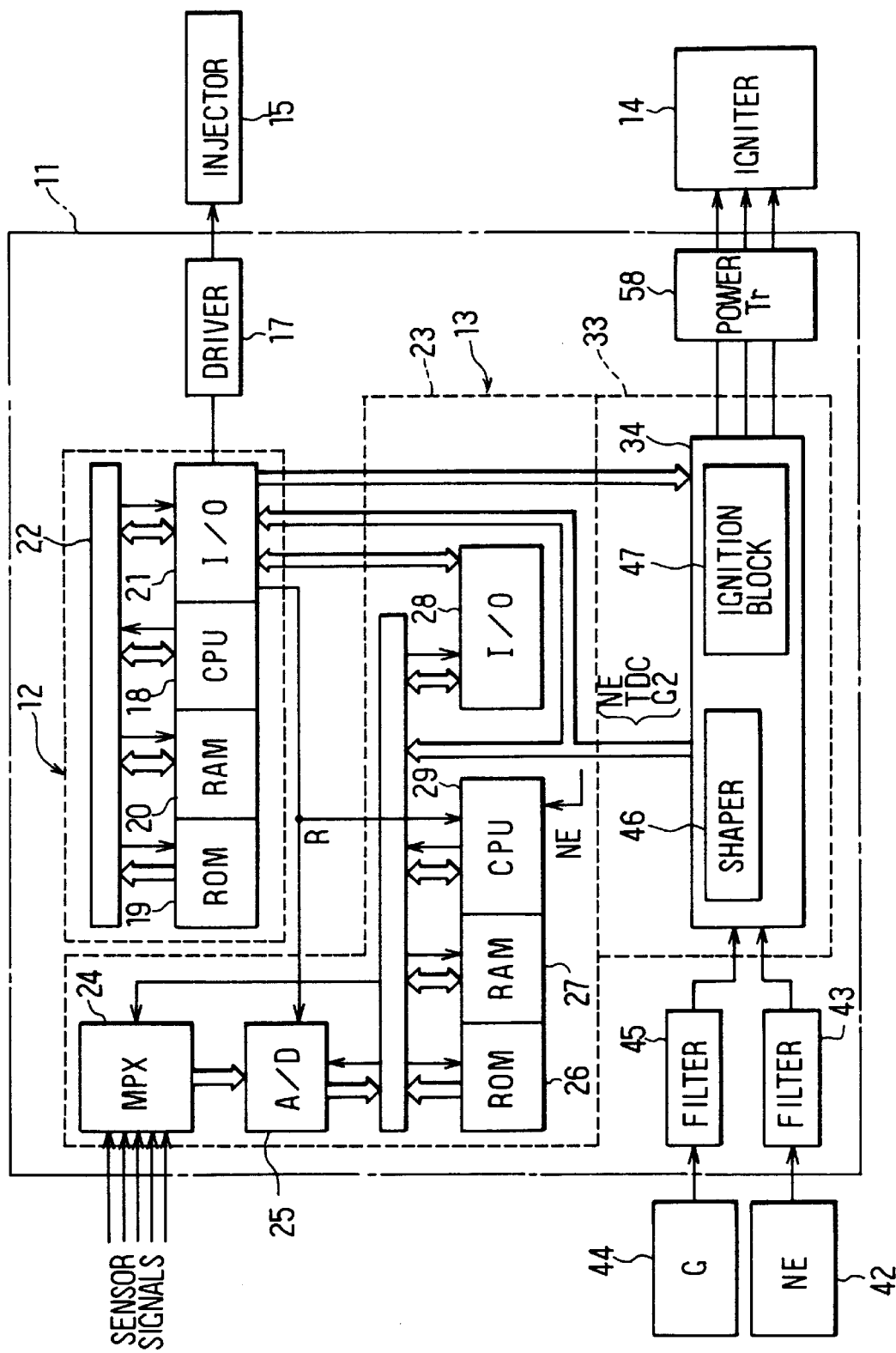
FIG. 3 is a block diagram showing an overall configuration of the engine control circuit.
Figure 4:
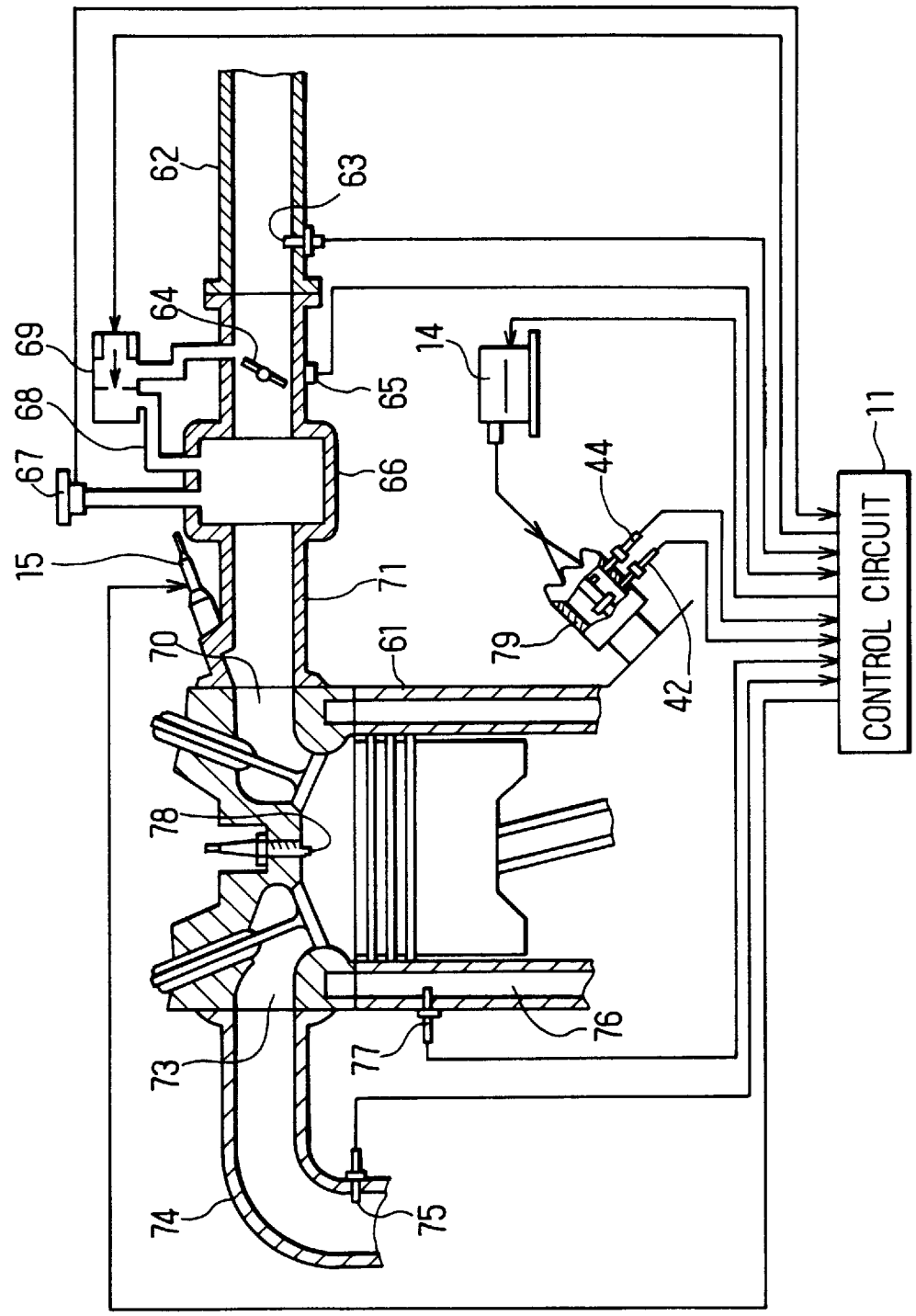
FIG. 4 shows an overall arrangement of an engine control system employing the control circuit of the embodiment.

Referring to FIG. 3, an engine control circuit 11 embodying the invention is shown which is responsive to several sensor signals transmitted thereto for performing fuel injection control and ignition control operations. The control circuit 11 includes a combination of a main or "master" microcomputer 12 and a subsidiary or "slave" microcomputer 13. The master microcomputer 12 is adapted for controlling the injector 15 as a target object being controlled by way of a driver circuit 17. The main microcomputer 12 is constituted by a CPU 18, a read only memory (ROM) 19, a random access memory (RAM) 20 and input/output (I/O) lines 21, which are interconnected by an associated data bus 22.

The slave microcomputer 13 is adapted for controlling read operations of several kinds of sensor signals, for controlling the igniter 14 (also an object to be controlled) via a power transistor circuit 58, and for providing suitable backups for the engine control by performing simple fuel-injection/ignition control procedures in place of the master microcomputer 12 when this is in malfunction.

Electrical circuitry of the slave microcomputer 13 is illustrated in FIG. 1, wherein this microcomputer 13 includes a 4-V (4 volts) guarantee circuit block 23 which is integrated therein for ensuring that the operating guarantee power supply voltage is at 4 volts. This 4-V guarantee block 23 is designed to operate with its power supply voltage of 4 volts or above. The slave microcomputer 13 is generally constituted by a multiplexer 24 for receiving the various kinds of sensor signals sent thereto and for switching input of them, an analog-to-digital (A/D) converter 25 for effecting A/D conversion for a received sensor signal from the multiplexer 24, a ROM 26 that prestores therein control software programs in a firmware fashion, a RAM 27 temporarily storing various kinds of information data as supplied thereto, an I/O section 28 for receiving or transmitting signals from or to the master microcomputer 12, a CPU 29, a crystal oscillator circuit 30 for providing a clock signal(s) to the CPU 29, a 4-V detector circuit 31 which detects certain timing whereat the power supply voltage potentially increases at a specific potential level of 4 volts after power-on thus generating and issuing a detection signal, and a third power-on reset circuit 32 which is responsive to reception of the detection signal for providing a reset signal to corresponding ones of the above circuit components.

As shown in FIG. 1, a 3-V (3 volts) guarantee circuit block 33 is also provided which operates with an operating guarantee power supply voltage of 3 volts. This block 33 includes a random logic circuit 34 as a hardware or hard-wired circuit which is fixed in circuit configuration. Very importantly, the random logic circuit 34 is an electrically reconfigurable hardware circuitry capable of being changed or "transformed" in logic function into any desired logic circuit thus enabling different logic functions to be attained by reconfiguration in different applications for a wide variety of engine specifications in automobile vehicles. This random logic circuit 34 is of the type that can be electrically reconfigured in logic every time power is fed to the engine control circuit 11. To do this, the 3-V guarantee block 33 is specifically arranged so that it includes a nonvolatile memory 35 for prestorage of circuit configuration set data, which may preferably be a programmable road-only memory (PROM), and more preferably an electrically programmable erasable read-only memory (EPROM). The block 33 also includes a data transfer sequencer circuit 37 for transmission of the configuration set data stored in the EEPROM 35 toward the random logic circuit 34, and a capacitor-resistor (CR) oscillator circuit 38 which provides a clock signal(s) to the transfer sequencer 37 and the random logic circuit 34. In addition, the block 33 is provided with a 3-V detector circuit 39 for detecting timing whereat the applied power supply voltage rises at 3 volts to generate and issue a corresponding detection signal, a first power-on reset circuit 40 responsive to the detection signal for providing a reset release command signal to corresponding ones of the above circuit components, and a second power-on reset circuit 41 which functions to force the random logic circuit 34 in the reset state until actual completion of the initial configuration or "reconfiguration" of the internal logic circuitry thereof. Both the 3-V guarantee block 33 with the above components therein and the 4-V guarantee block 23 in which the slave microcomputer 13 is embedded are integrated together on a semiconductor chip providing a single LSI chip.

It can be seen from FIG. 3 that the random logic circuit 34 is connected to receive the rotation angle signal (NE signal) derived from the rotation angle sensor 42 through a filter 43, and also receive the cylinder identification signals (G1 and G2 signals) issued from the cylinder identification sensor 44 via another filter 45. These signals NE, G1 and G2 supplied via both filters 43, 45 are then waveform-shaped by a waveform shaper circuit 46 provided in the random logic circuit 34. The resulting waveform-shaped NE signal (GNNEO) is passed to the master microcomputer 12 as well as to the ignition control circuit block 47 also arranged in the random logic circuit 34.

Figure 2:
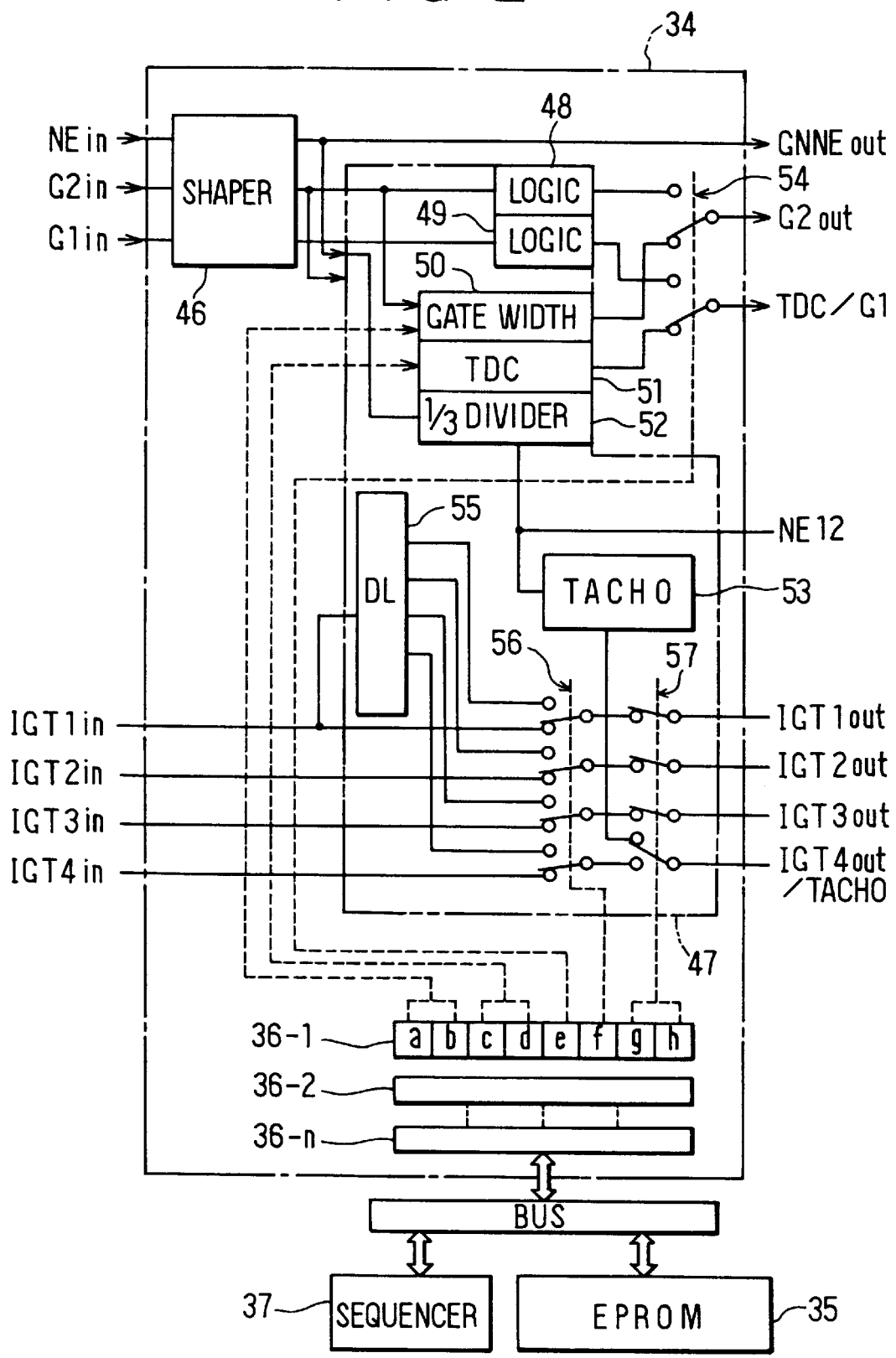
FIG. 2 is a circuit diagram showing one exemplary configuration of a random logic circuit in the embodiment.

As shown in FIG. 2, a couple of logic units 48, 49 are arranged in the ignition control block 47 for receiving the G1 and G2 signals as waveform-shaped by the waveform shaper 46. Also arranged in this block 47 are a gate width setter circuit 50 which determines the gate width for the input G2 signal, a circuit 51 for setting a TDC position from a pulse-absent portion, a frequency-divider circuit 52 for one-third ($\frac{1}{3}$) frequency-division of NE signal, and a circuit 52 responsive to an output of the frequency-divider 53 for generating and issuing a tachometer signal (TACHO). A first switch circuit 54 is operatively coupled to the logic units 48, 49, the G2 input gate width setter 50 and the TDC position setter 51, for allowing two of the four output signals thereof to selectively propagate through it toward corresponding output terminals of the switch 54 causing them to be sent forth as two selected output signals over G2 and TDC/G1 output lines shown.

Also included in the ignition control circuit block 47 is a distribution logic unit (DL) 55 for distribution of incoming ignition command signals IGT1 to IGT4 derived from the master microcomputer 12. Two, second and third, switch circuits 56, 57 are operatively coupled to the distribution logic 55 for receiving four output signals, the ignition command signals IGT1–IGT4 and the tachometer signal TACHO, and for allowing four of these signals to selectively pass therethrough to be taken onto four associated output signal lines IGT1out to IGTout 4. Additionally, the random logic circuit 34 may also include a plurality of extra switch circuits (not shown) for changeover of logic configuration thereof.

The random logic circuit 34 further includes an array of a predefined number (n) of 8-bit registers 36-1, 36-2, . . . , 36-n. When the power supply voltage is above 3 volts after power-on, the configuration set data is read out of the EEPROM 35 and is then transferred to the register array 36. In response to receipt of such data, the first to third switch circuits 54, 56, 57 and the extra switch circuits not shown execute switching operations to establish a desired pattern of internal logic circuitry, thus electrically reconfiguring the random logic circuit 34 into a new configuration for attaining a new logic function.

Figure 5:
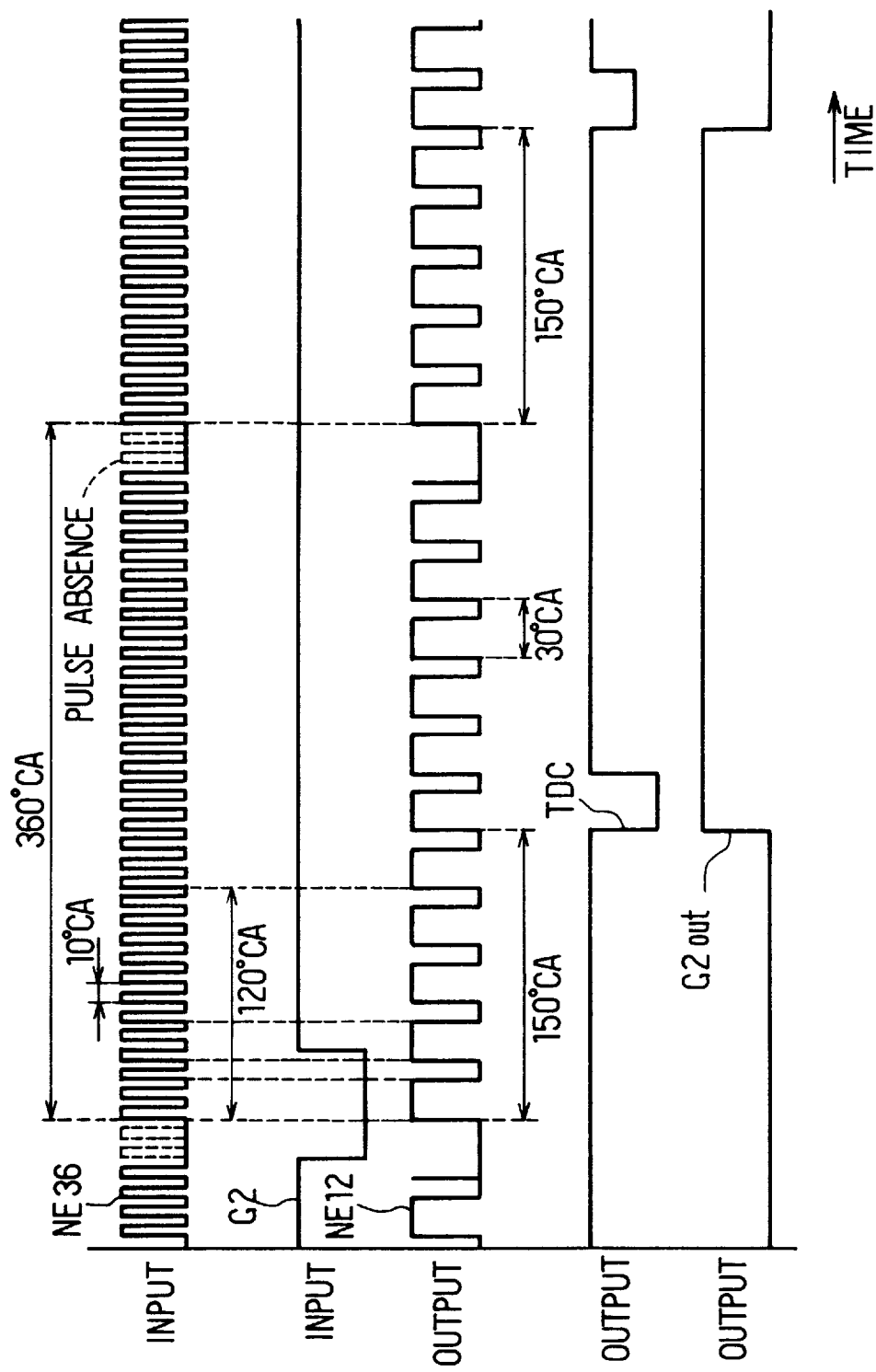
FIG. 5 is a time chart showing the pulse sequence of the operation of the embodiment, including input signals and output signals upon receipt of an NE signal (NE36) of 10° CA cycle and a G2 signal.
Figure 6:
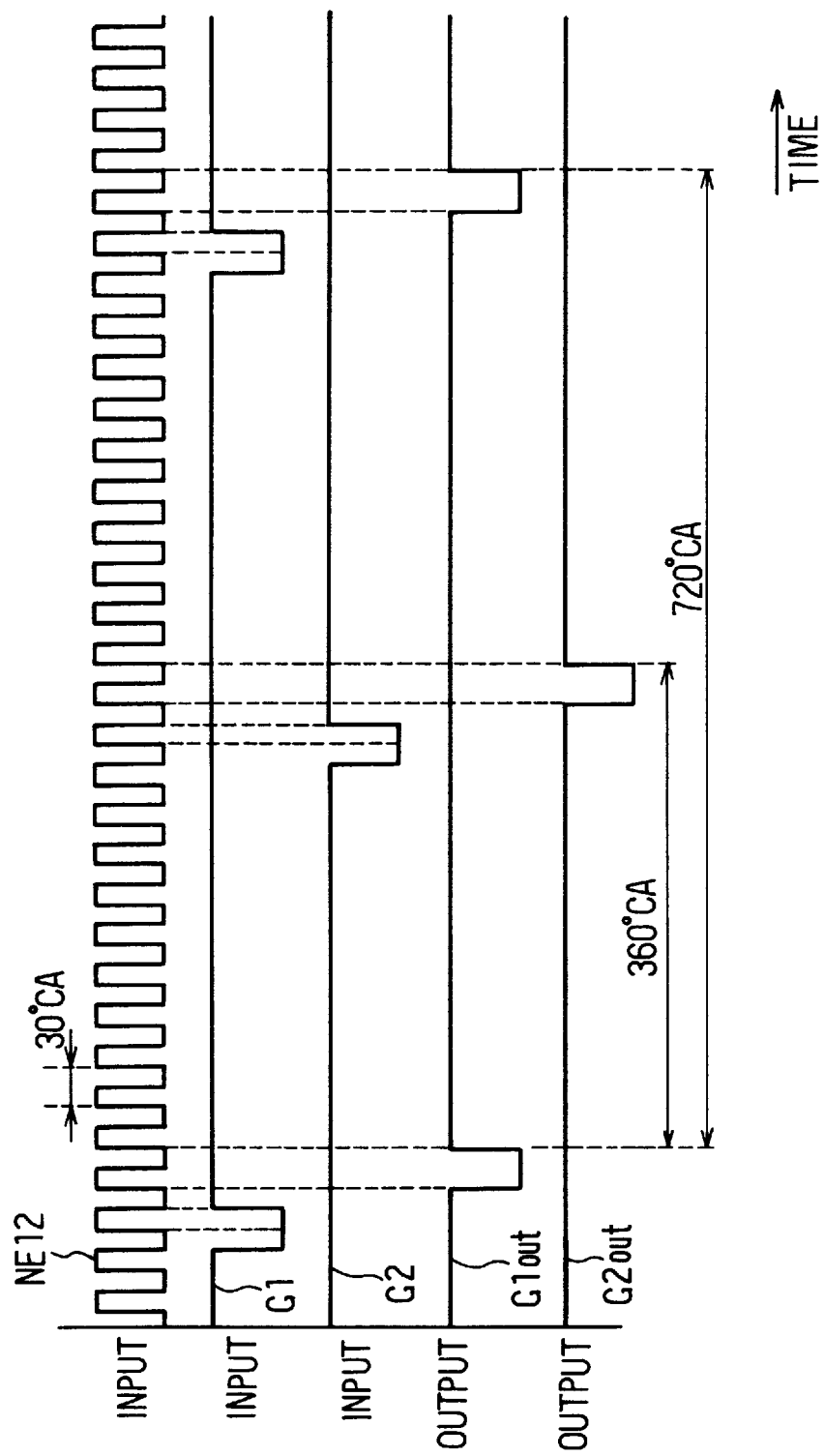
FIG. 6 illustrates a time chart showing the pulse sequence of the operation of the embodiment, including input signals and output signals upon receipt of an NE signal (NE12) of 30° CA cycle and G1 and G2 signals.

For instance, the first register 36-1 has first two bits a and b, the logic values of which are used to set the G2 input gate width (120° CA in the case of six cylinders). The TDC position from the pulse-absent portion may be determined based on the values of following bits c and d. In response to the value of a next nearby bit e of the register 36-1, the first switch circuit 54 is switched into state of conduction providing either one of two configuration states that offer different pulse sequencing functions for different cylinder identification schemes as shown in FIGS. 5 and 6. Here, FIG. 5 shows the pulsing sequence as exhibited by one circuit configuration, wherein there is no G1 signal, the NE signal (NE36) with 10° CA period and the G2 signal are for input thereto, and $\frac{1}{3}$ frequency-divided NE signal (NE12), TDC and G2 signals are outputted. Alternatively, FIG. 6 shows the pulsing sequence as obtained by another circuit configuration, which receives as input signals the NE signal (NE12) with 30° CA period and the G1 and G2 signals, and which generates G1out and G2out signals as output signals thereof.

The second switch circuit 56 changes state in response to the value of a bit f of the first resistor 36-1. In the case of six engine cylinders for example, the switching is effected to select one from the two options: receiving three input ignition command signals IGT to issue three separate output signals, or receiving a single ignition command signal IGT to distribute it among three output lines. The third switch circuit 57 changes its switching path in response to the value of last two bits g, h of register 36-1 thereby causing four ignition command signals IGT to be generated as output signals in the case of eight cylinders, or, alternatively, in the case of six cylinders, causing three ignition command signals IGT and tachometer signal TACHO to emerge as output signals thereof.

Similarly, the second and following registers 36-2 to 36-n may have respective bit values which are used to cause the extra switch circuits (not shown) to perform required switching operations thus setting a corresponding circuit configuration of the random logic circuit 34.

Additionally, the random logic circuit 34 is connected at its output to the power transistor circuit 58 which supplies amplified ignition command signals to the igniter 14 coupled thereto as shown in FIG. 3.

Figure 7:
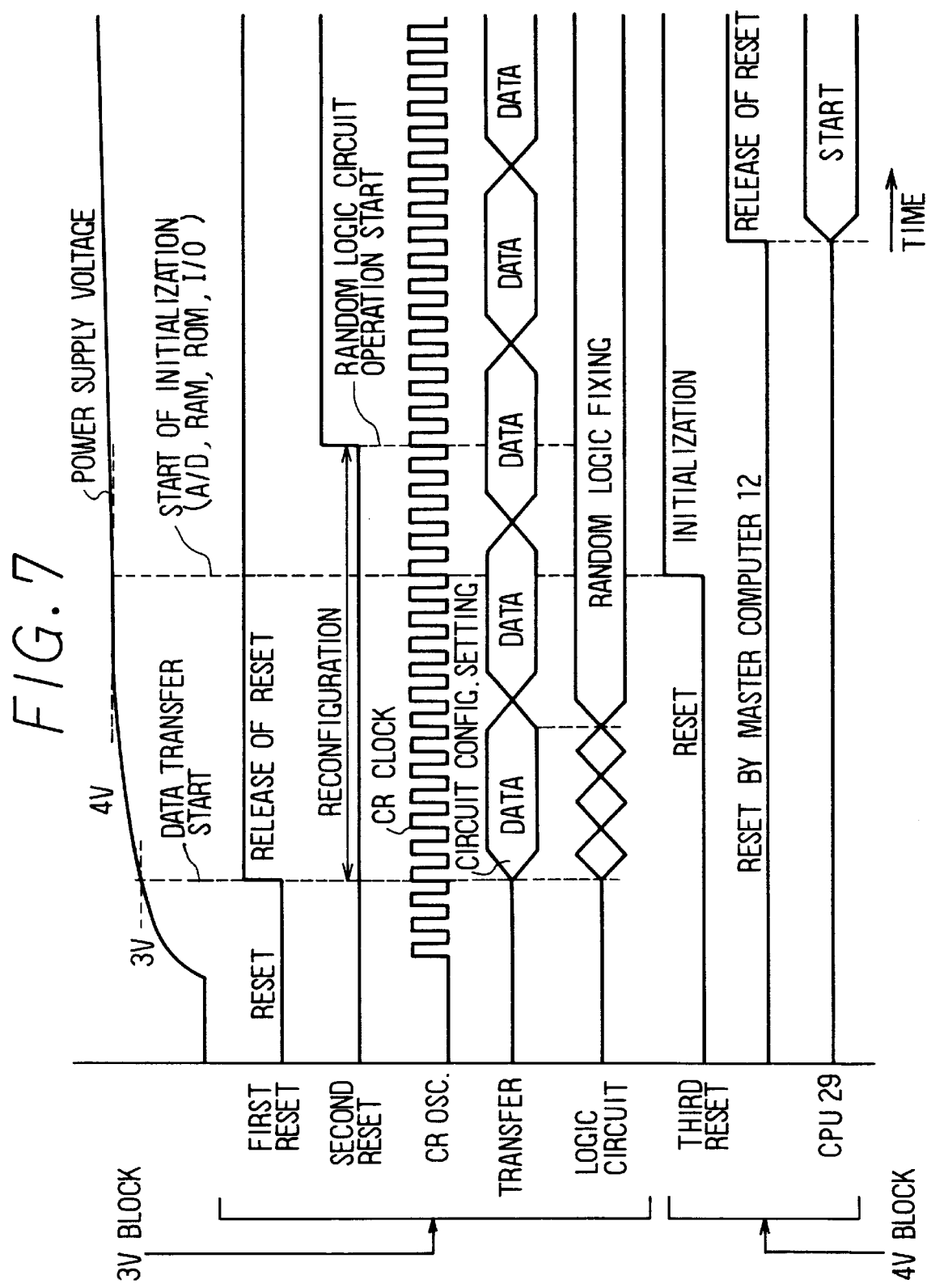
FIG. 7 is a time chart showing the pulsing sequence of the operation of a subsidiary microcomputer, covering up to its activation after power is applied.

The operation of the engine control circuit 11 will now be described with reference to the time chart of FIG. 7, which covers part of the system control procedure until when the slave microcomputer 13 starts to perform its intended control operations after power is on, that is, after an ignition switch (not shown) turns on. After power-on, the 3-V guarantee circuit block 33 is forced by the first power-on reset circuit 40 to hold the reset state until the power supply voltage reaches 3 volts, whereas the 4-V guarantee block 23 is forced by the third power-on reset circuit 32 in the reset state until the power supply voltage rises up to 4 volts.

In the 3-V guarantee block 33 the CR oscillator 38 begins oscillating before the power supply voltage reaches 3 volts; thereafter, when the power supply voltage is at 3 volts, the reset state retained by the first power-on reset circuit 40 is then released allowing the data transfer sequencer 37 to operate in synchronism with the oscillation pulse (clock) signal of the CR oscillator 38. This permits transmission of an address signal(s) from the sequencer 37 to both the EEPROM 35 and the register arrays 36 of the random logic circuit 34, causing the circuit configuration set data stored in the EEPROM 35 to be transferred the register array 36. Upon receipt of such data, several or all of the first to third switch circuits 54, 56, 57 and other switch circuits (not shown) execute switching operations in such a manner as to make up a corresponding internal logic circuitry of the random logic circuit 34. In this way, the random logic circuit 34 may be electrically reconfigured in logic circuitry thus enabling the engine control device 11 to be adaptable for use with a specific type of automobile internal combustion engine, without the need of any physical rearrangement of a connection pattern of aluminum lead wires of the random logic circuit 34.

One-time execution (800 $\mu$s, for example) of data-transfer/configuration or "reconfiguration" procedure may generally be sufficient to provide a proper logic setting of the random logic circuit 34; but there can still remain the possibility of failure due to electrical noises or other interfering causes. To avoid such possibility more satisfactorily, it is recommendable that when the power supply voltage becomes above 3 volts, the electrical reconfiguration procedure is repeated enhancing the reliability. In addition to such repeated reconfigurations, the operation of random logic circuit 34 is interrupted by the second power-on reset circuit 41 until complete elapse of a predefined length of time period, which may be a maximal duration required to accurately set the intended logic configuration without accompanying influence of noise—preferably 12.8 ms, for example. This ensures that any erroneous signals will no longer be generated from the random logic circuit 34 which is unstable in operation since it is under reconfiguration. After elapse of the predefined duration, the second power-on reset circuit 41 attempts to release the reset state causing the random logic circuit 34 to generate and issue desired pulse signals as shown in FIGS. 5 or 6. In this situation, the slave microcomputer 13 is yet rendered inoperative, while the waveform shaper 46 is operative.

In the 4-V guarantee block 23, when the power supply voltage is at 4 volts, the third power-on reset circuit 32 attempts to release the reset state initializing the A/D converter 25, ROM 26, RAM 27, I/O 28 and others. At this time, the CPU 29 of the slave microcomputer 13 is yet rendered inoperative and remains in the reset state due to receipt of the reset signal from the master microcomputer 12. This is because if one-time reconfiguration were in failure due to inclusion of noise or the like, it could happen that the random logic circuit 34 fails to be set in an intended logic configuration when the reset state is released by the third power-on reset circuit 32. Accordingly, after the predefined duration of reconfiguration processing (the maximum period required for completion of reconfiguration) has elapsed to ensure that the intended logic configuration has been set accurately, a further wait time should be present prior to the reset release of the slave microcomputer 13 by the master microcomputer 12 thus rendering the slave microcomputer 13 operative to perform its inherent control operations.

Figure 8:
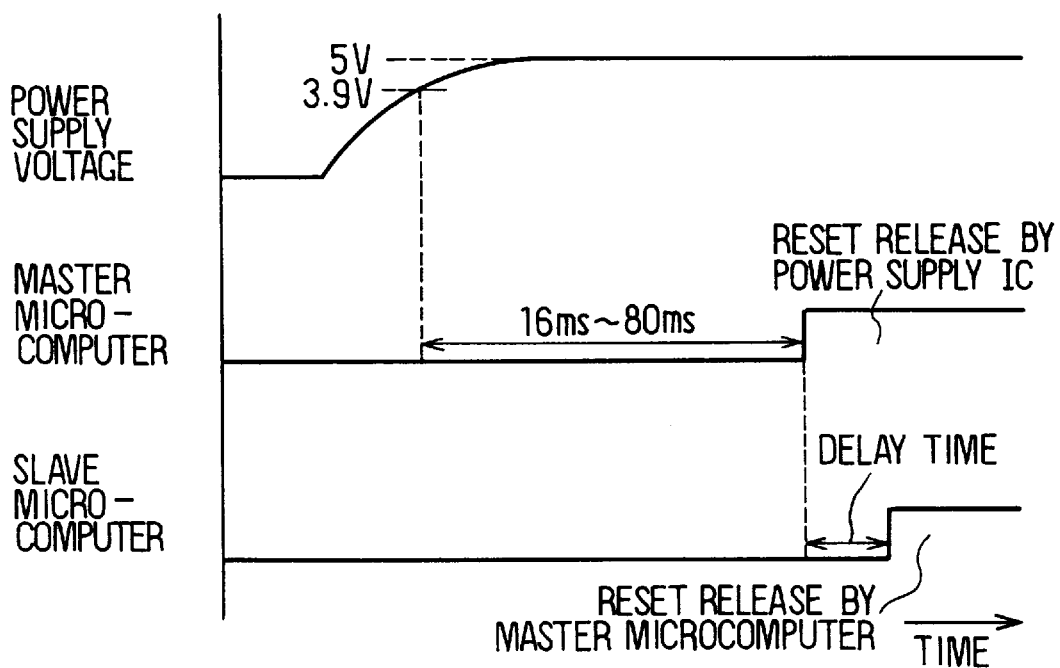
FIG. 8 is a time chart showing the pulse sequence of the operation of the embodiment, indicating the relation between the reset-release timing of a main microcomputer and that of the subsidiary microcomputer after power is fed.

It should be noted that as shown in FIG. 8, the master microcomputer 12 is reset-released by a power IC (not shown) after elapse of 16 to 80 ms, for example, from a time point whereat the power supply voltage attains 3.9 volts. With a slight delay time from the end of such elapsed time due to the presence of a time consumption for initial execution of built-in software programs, the CPU 18 of the main microcomputer 12 becomes operative to provide a reset release signal to the slave microcomputer 13, which is then reset-released. This means that the total of 16 ms plus the delay time is needed in minimum until when the slave microcomputer 13 is actually reset-released after the power supply voltage of the master microcomputer 12 attains at 3.9 volts. Such a total delay time is sufficiently greater in duration than the aforementioned logic configuration setting time; therefore, it can ensure that the intended reconfiguration processing is completed before the slave microcomputer 13 gets started.

It has been described that the timing of activation of the slave microcomputer 13 comes after that of the random logic circuit 34. The reason for this is to enable normal signal processing to be reliably attained immediately after the slave microcomputer 13 becomes operative in such a way that the waveform shaper 46 is rendered operative to begin to perform its wave-shaping operations for the NE signal and the cylinder identification signals (G1 and G2 signals) prior to the actual activation of slave microcomputer 13.

Figure 9:
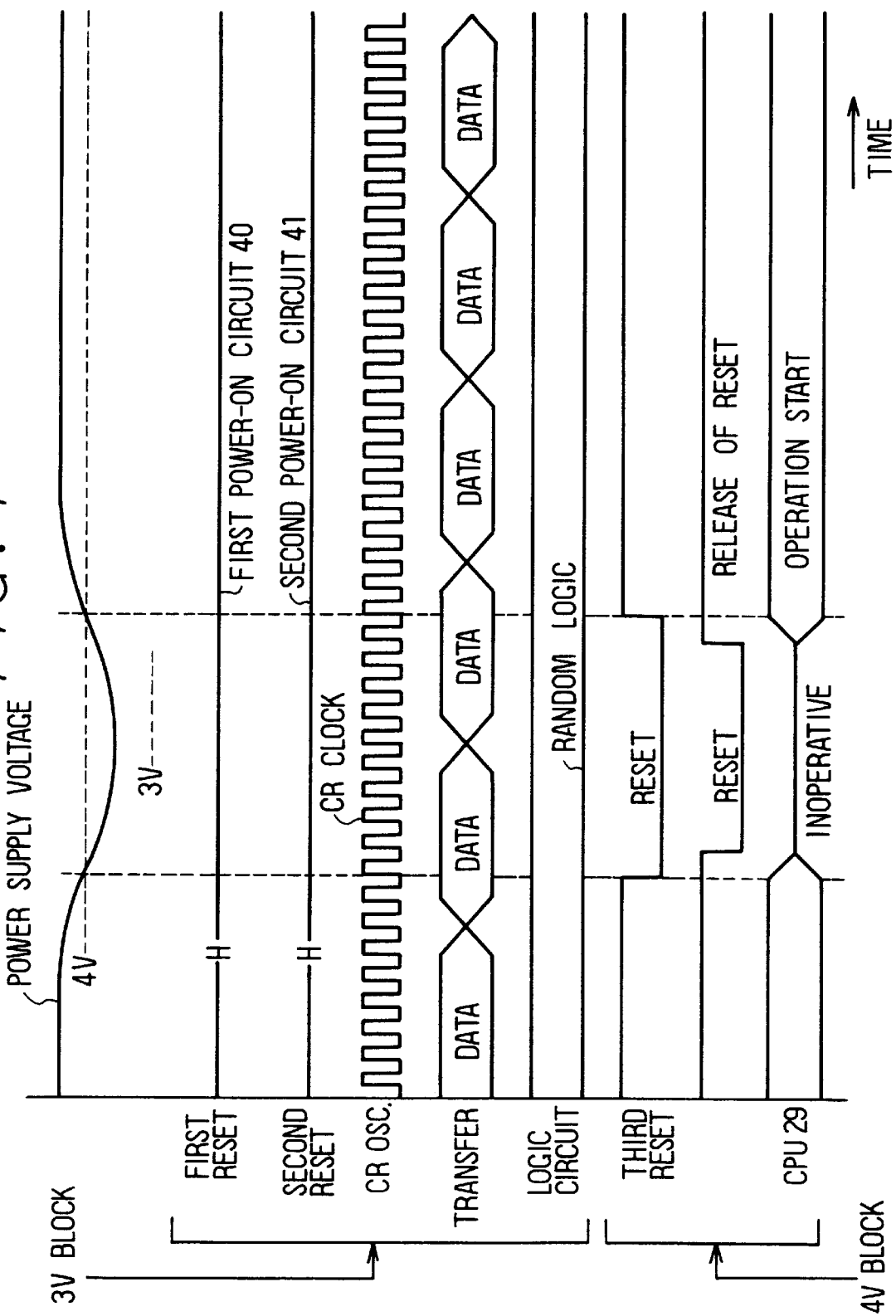
FIG. 9 is a time chart showing how major pulse signals behave when the applied power supply voltage intermittently varies in potential during the operation.

Referring to FIG. 9, a description will be given of the case where the power supply voltage of above 4 volts is intermittently decreased below 4 volts, which may possibly occur when a starter (not shown) operates which is operatively coupled to the internal combustion engine. Here, the leftmost sides of respective signals in FIG. 9 are assumed to continue from the rightmost sides of the corresponding signals in FIG. 7. Even when the power supply voltage is lower than 4 volts, the 3-V guarantee block 33 is still in the operation guarantee region as far as the power supply voltage is equal to or above 3 volts. Therefore, respective circuit sections of the 3-V guarantee block 33 may continue operating in substantially the same way as in the case where the power supply voltage is higher than 4 volts. There are no essential differences therebetween.

By contrast, the 4-V guarantee block 23 offers its operating guarantee power supply voltage that is equal to or higher than 4 volts. Accordingly, when the power supply voltage drops down to 4 volts or below, the third power-on reset circuit 32 is rendered operative forcing the CPU 29 of the slave microcomputer 13 in the reset state so that the operation thereof is interrupted. Thereafter, when the power supply voltage recovers at 4 volts or above, the reset state is released by the third power-on reset circuit 32.

Under the circumstances, the master microcomputer 12 is in the reset state when the power supply voltage is at 3.9 volts or below. Accordingly, while the master microcomputer 12 continues operating when the power supply voltage is between 3.9 and 4.0 volts, the slave microcomputer 13 is in the reset state. At this time, the slave microcomputer 13 stops supplying the master microcomputer 12 with a watch-dog clear command signal WDC, causing the master microcomputer 12 to attempt to reset every time a fixed length of time has elapsed.

Thereafter, when the power supply voltage is at 3.9 volts or below, the master microcomputer 12 is in the reset state, also. Therefore, the reset signal fed from the main microcomputer 12 to the slave microcomputer 13 is kept in the reset state. When the power supply voltage potentially recovers to fall within the range of from 3.9 to 4.0 volts, the master microcomputer 12 is then reset-released while forcing the slave microcomputer 13 to remain in the reset state. This means that the interruption of supplement of the watch-dog clear command signal WDC from the slave 13 to the master microcomputer 12 continues. The master microcomputer 12 thus attempts to reset the slave microcomputer 13 at predefined time intervals.

When the power supply voltage recovers 4 volts or above, the supplement of the watch-dog clear command signal WDC from the slave 13 to the master microcomputer 12 is restarted eliminating transmission of the reset signal from the master 12 to the slave microcomputer 13.

Figure 10:
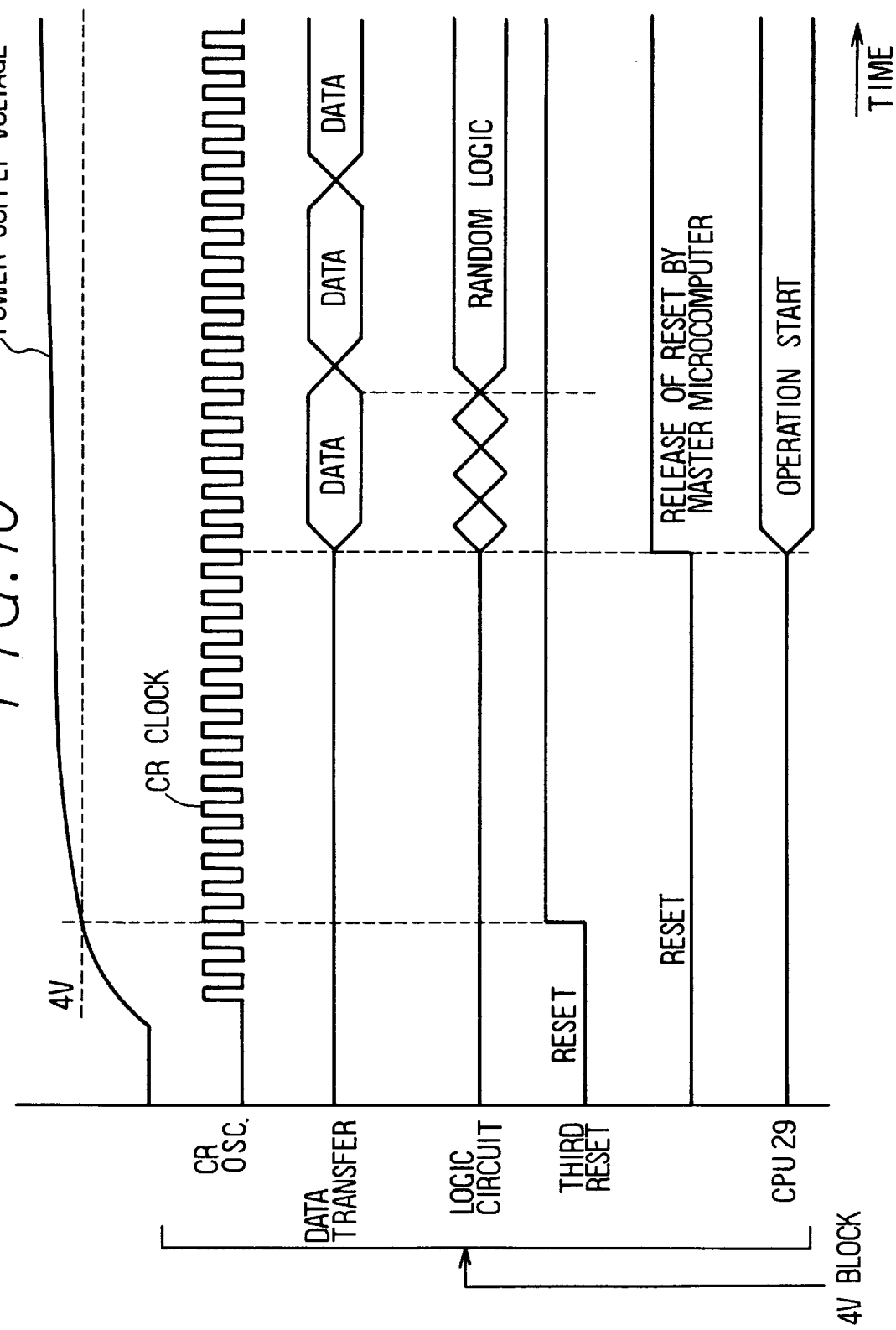
FIG. 10 is a time chart showing, as a comparison, the pulsing sequence of major signals after application of the power supply voltage.

It is likely that another approach to accomplishment of the reconfiguration procedure of the random logic circuit 34 is also available. In a comparison shown in FIG. 10 the circuit configuration set data is stored in a built-in ROM of the slave microcomputer 13 and is read for transmission after the CPU 29 of slave microcomputer 13 is reset-released after power is applied.

With this example, reading of the configuration set data written into the ROM is enabled only after the slave microcomputer 13 is operative due to reset-release of the CPU 29 of slave microcomputer 13 after power-on; therefore, activation of the slave microcomputer 13 and transmission of the configuration set data from the slave CPU 29 to the random logic circuit 34 must get started substantially simultaneously. Due to such simultaneous scheme, it is no longer expectable to ensure that any intended logic reconfiguration procedure for the random logic circuit 34 is completed before activation of the slave microcomputer 13. This results in an increase in possibility of occurrence of system malfunction during such a period. To eliminate this, it may be considered that an additional arrangement is employed for forcing the activation of inherent control operations to be delayed until the actual completion of logic reconfiguration processing. With such an arrangement however, the delay of activation of inherent control serves to degrade the processing rate of the system as a whole, which is against demands for high-speed engine control processing.

With the embodiment, by taking into account of the fact that the 3-V guarantee block 33 in the random logic circuit 34 first reaches the operation guarantee power supply voltage before the slave microcomputer of the 4-V guarantee block 23 do it after power-on, the configuration-data storage EEPROM 35 is arranged in the 3-V guarantee block 33 enabling the configuration set data stored therein to be read and transferred to the register array 36 of the random logic circuit 34 to reconfigure the internal logic circuitry of the same. It is thus possible to successfully set or establish an intended logic circuitry of the random logic circuit 34 during a certain time period in which the power supply voltage rises from 3 to 4 volts thus enabling both elimination of malfunction and achievement of high-speed processing simultaneously. Furthermore, the logic configuration of the random logic circuit 34 can be freely modified merely by changing the set data as stored in the EEPROM 35. This unique arrangement for logic reconfiguration can avoid a need of physical modification of aluminum lead-wire connection pattern of the random logic circuit 34, which may lead to the possibility of common use of the random logic circuit 34 among a wide variety of internal combustion engines that differ from one another in structure and specification, reducing hardware complexity and cost in the products.

Another significant advantage of the engine control circuit with the electrically reconfigurable hardware circuit is that, since the random logic circuit 34 is forced by the second power-on reset circuit 41 in the reset state at least until completion of an intended logic reconfiguration procedure for the random logic 34, any erroneous signals can be prevented from being developed by the random logic 34 that is in the process of being reconfigured and is thus unstable in operation. This serves to further increase reliability of the system.

A yet another advantage of the engine control circuit is that, by allowing the slave microcomputer 13 to get started upon receipt of a reset signal from the master microcomputer 12 only after the random logic circuit 34 was reset-released by the second power-on reset circuit 41 to be rendered operative, it becomes possible that the timing of activation of the slave microcomputer 13 can be delayed after that of the random logic 34. Such delay of activation timing can ensure that the waveform shaper 46 in the random logic 34 is operative prior to activation of the slave microcomputer 13 to thereby start executing wave-shaping operations of the NE signal and the cylinder identification signals (G1 and G2 signals). This in turn can permit rapid execution of high reliable signal processing even just after the slave microcomputer 13 gets started.

A still further advantage of the embodiment is that both the 4-V guarantee block 23 incorporating the slave microcomputer 13 and the 3-V guarantee block 33 including the random logic circuit 34 are integrated on a semiconductor substrate to attain a one-chip LSI with such blocks 23, 33 different from each other in operating guarantee power supply voltage, thereby enhancing mounting efficiency and packing density while achieving down-sizing as compared to the case where both blocks 23, 33 are in separate LSI chips respectively.

In the illustrative embodiment the two circuit blocks 23, 33 are integrated on a single substrate to attain one-chip LSI device. The present invention however should not be exclusively limited to such single-LSI arrangement; it may also be applicable to two-separate LSI arrangement with the objects of the invention obtainable.

In the above embodiment the circuit configuration set data is transferred from the data storage EEPROM 35 to the register section 36 in the random logic circuit 34; however, such arrangement may be modified in such a manner that a plurality of combinations of configuration set data are respectively prestored in a corresponding plurality of separate register sections arranged in the random logic circuit 34. In this case, the data storage ROM may be modified so that it stores a specific data portion which identifies which register section should be selected, thus allowing the random logic circuit 34 to be reconfigured in logic based on the contents of such selected register section in response to the specific data of the ROM.

Furthermore, while the embodiment is applied to the slave microcomputer 13 that operates under the control of the master microcomputer 12, the invention may also be applicable to a control system which incorporates an independent or "stand-alone" microcomputer free from such "master-slave" relationship and an associated electrically logic-reconfigurable hardware circuit as a backup circuitry. The hardware circuit should not be limited to the random logic circuit only, and that it may alternatively be one of any types of presently available hardware circuits including one designed to take part of the I/O processing procedures of the microcomputer.

Moreover, the present invention may be applicable not only to the engine control circuit described above but also to other types of possible control circuits, including ones for use in various systems of different architectures other than automobile vehicles. Additionally, the operation guarantee power supply voltages of respective circuit blocks 23, 33 should not be limited to 4 and 3 volts; these may alternatively to 4.5 and 3.5 volts respectively.

The random logic section 34 may alternatively arranged so that once the configuration of it is determined depending upon its application to a specific type of automotive vehicle or its internal combustion engine, such once-established configuration will no longer be changeable irrespective of repeated power-on and off operations thereafter.

While the invention has been particularly shown and described with reference to preferred embodiment thereof, it will be understood by those skilled in the art that the foregoing and other changes in form and details may be made therein without departing from the spirit and scope of the invention.

What is claimed is:

1. A control system having a microcomputer and a hardware circuit capable of being selectively set in configuration, said control circuit comprising:
   a first oscillator circuit operative above a first potential level;
   a second oscillator circuit operative above a second potential level lower than the first potential level;
   a nonvolatile memory for storing therein circuit configuration set data for said hardware circuit; and
   setter means connected to said second oscillator circuit and responsive to the configuration set data stored in said nonvolatile memory for setting the configuration of said hardware circuit before said microcomputer connected to said first oscillator circuit is rendered operative after power is applied.

2. The control system according to claim 1, wherein:
said microcomputer is rendered operative when a power supply voltage reaches the first potential level; and
said setter means sets the configuration of said hardware circuit based on the configuration set data stored in said nonvolatile memory when the power supply voltage reaches the second potential level.

3. The control system according to claim 1, wherein:
said setter means includes;
a register for receiving the configuration set data stored in said nonvolatile memory transferred thereto, and
a first power-on reset circuit for starting transmission of the configuration set data from said nonvolatile memory to said register when the power supply voltage rises at the second potential level after application of power.

4. The control system according to claim 3, wherein:
said first power-on reset circuit allows, when the power supply voltage is above the second potential level, the configuration set data to be repeatedly transferred from said nonvolatile memory to said register.

5. The control system according to claim 1, wherein:
said setter means includes:
a second power-on reset circuit for rendering said hardware circuit inoperative until elapse of a time required to set the configuration of said hardware circuit in response to the configuration set data as transferred to said register.

6. The control system according to claim 5, wherein:
said second power-on reset circuit forces said hardware circuit to remain inoperative at least until when said microcomputer begins to operate while the power supply voltage is at or above the second potential level.

7. The control system according to claim 1, wherein:
said hardware circuit is responsive to the configuration set data of said nonvolatile memory for selecting one from among a plurality of predefined configurations.

8. The control system according to claim 3, wherein:
said first power-on reset circuit causes, when the power supply voltage is below the second potential level, said hardware circuit to be in a reset condition.

9. The control system according to claim 2, wherein:
said microcomputer executes initialization processing when the power supply voltage applied thereto increases to the first potential level, and begins to operate in response to an external signal after said hardware circuit is rendered operative by said second power-on reset circuit.

10. The control system according to claim 1, wherein:
said control circuit is for use in controlling an internal combustion engine.

11. The control system according to claim 10, wherein:
said hardware circuit includes at least one of input means for receiving an output signal of rotation angle detector means for detecting a rotation angle of said engine, and output means for providing an ignition signal for ignition control of said engine.

12. The control system according to claim 11, wherein:
said setter means sets at least one of said input means and said output means in circuit configuration.

13. The control system according to claim 1, wherein:
said microcomputer and said hardware circuit are integrated into a single large scale integrated circuit chip.

14. The control system according to claim 1, wherein:
the selected configuration is retained unchangeable once said hardware circuit is set in a selected configuration.

15. A control system for an engine having a microcomputer and a hardware circuit operable by a voltage lower than that of said microcomputer and selectively changeable in configuration after power is applied, said control system comprising:

a nonvolatile memory provided in said hardware circuit for storage of circuit configuration set data; and means for setting periodically a configuration of said hardware circuit in response to the configuration set data stored in said nonvolatile memory before said microcomputer is rendered operative after power is fed, said hardware circuit being for producing a fixed control signal for said engine before said microcomputer produces a control signal for said engine.

16. The control system according to claim 15, wherein:

said hardware circuit includes;

a register for receiving the configuration set data stored in said nonvolatile memory transmitted thereto;

a first power-on reset circuit for allowing the configuration set data to be transferred from said nonvolatile memory to said register when a power supply voltage increases to a potential level corresponding to an operating voltage of said hardware circuit after power is applied; and a second power-on reset circuit for forcing said hardware circuit to remain inoperative until elapse of a time required to complete setting of the configuration of said hardware circuit in response to the configuration set data as transferred to said register.

17. A control system having a microcomputer and a hardware circuit capable of being selectively set in configuration, said control circuit comprising:

an oscillation circuit;

a nonvolatile memory for storing therein circuit configuration set data for said hardware circuit; and setter means connected to said oscillation circuit and responsive to the configuration set data stored in said nonvolatile memory for setting the configuration of said hardware circuit before said microcomputer is rendered operative after power is applied;

said setter means setting the configuration of said hardware circuit periodically in response to oscillation output of said oscillation circuit.

18. The control system according to claim 17, wherein:

the oscillation circuit is a capacitor-resistor oscillator capable of oscillating above a voltage that is lower than that required for the microcomputer to become operative.

19. The control system according to claim 17, wherein:

said hardware circuit includes at least one of (a) input means for receiving an output signal of rotation angle detector means for detecting a rotation angle of said engine, and (b) output means for providing an ignition signal for ignition control of said engine; and said setter means sets at least one of said input means and said output means in circuit configuration.

20. The control system according to claim 17, wherein:

said microcomputer and said hardware circuit are integrated into a single large scale integrated circuit chip.

21. The control system according to claim 17, wherein:

the selected configuration is retained unchangeable once said hardware circuit is set in a selected configuration.

22. A redundant internal combustion engine control system comprising:

a programmed microprocessor-based primary control system connected for normal engine control;

a re-configurable hardwired backup control system connected for alternative back-up engine control;

said backup control system being configured to operate at an operating-voltage lower than the minimum operating voltage of said primary control system.

23. A redundant method for controlling an internal combustion engine, said method comprising:

controlling the engine with a programmed microprocessor-based control system when an available-operating voltage is above a predetermined level; and alternatively controlling the engine with a configurable hardwired control circuit when said available operating voltage is below said predetermined level.

* * * * *